(No Model.) 2 Sheets—Sheet 2.
J. P. BURNHAM.
MACHINE FOR TONGUING AND GROOVING ENDS OF FLOORING BOARDS.
No. 569,611. Patented Oct. 20, 1896.
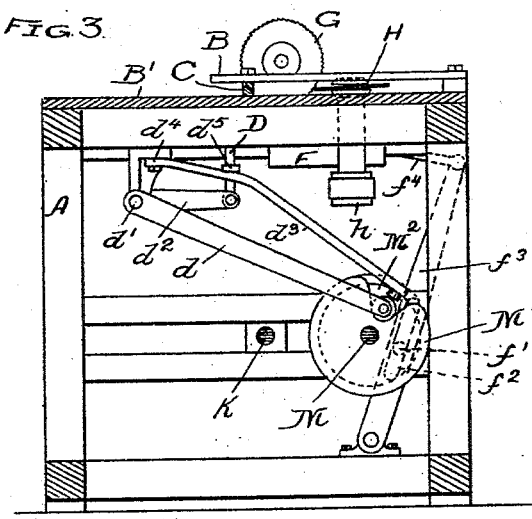
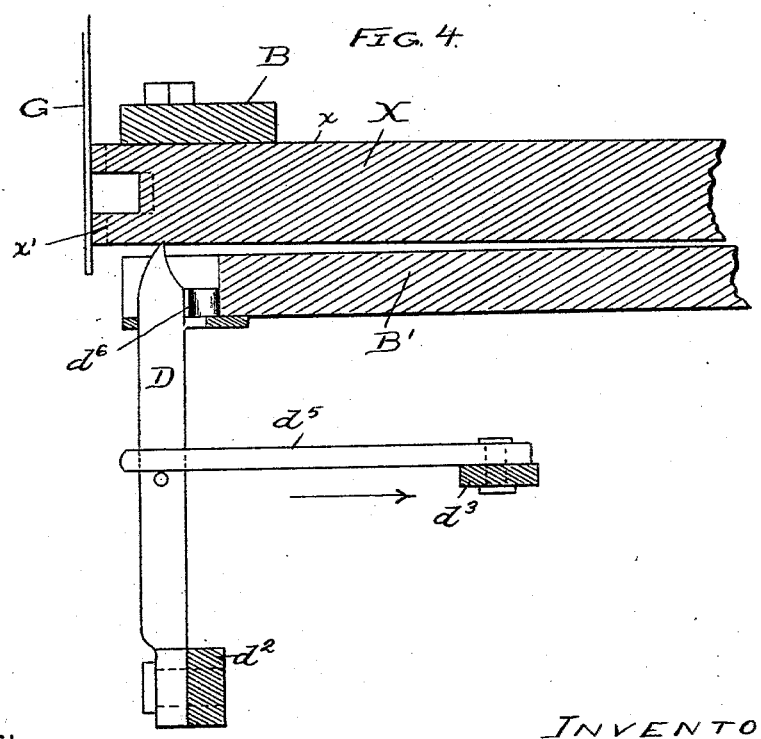
WITNESSES:
INVENTOR:
JOHN P. BURNHAM
BY Munday, Evarts & Adcock,
HIS ATTORNEYS

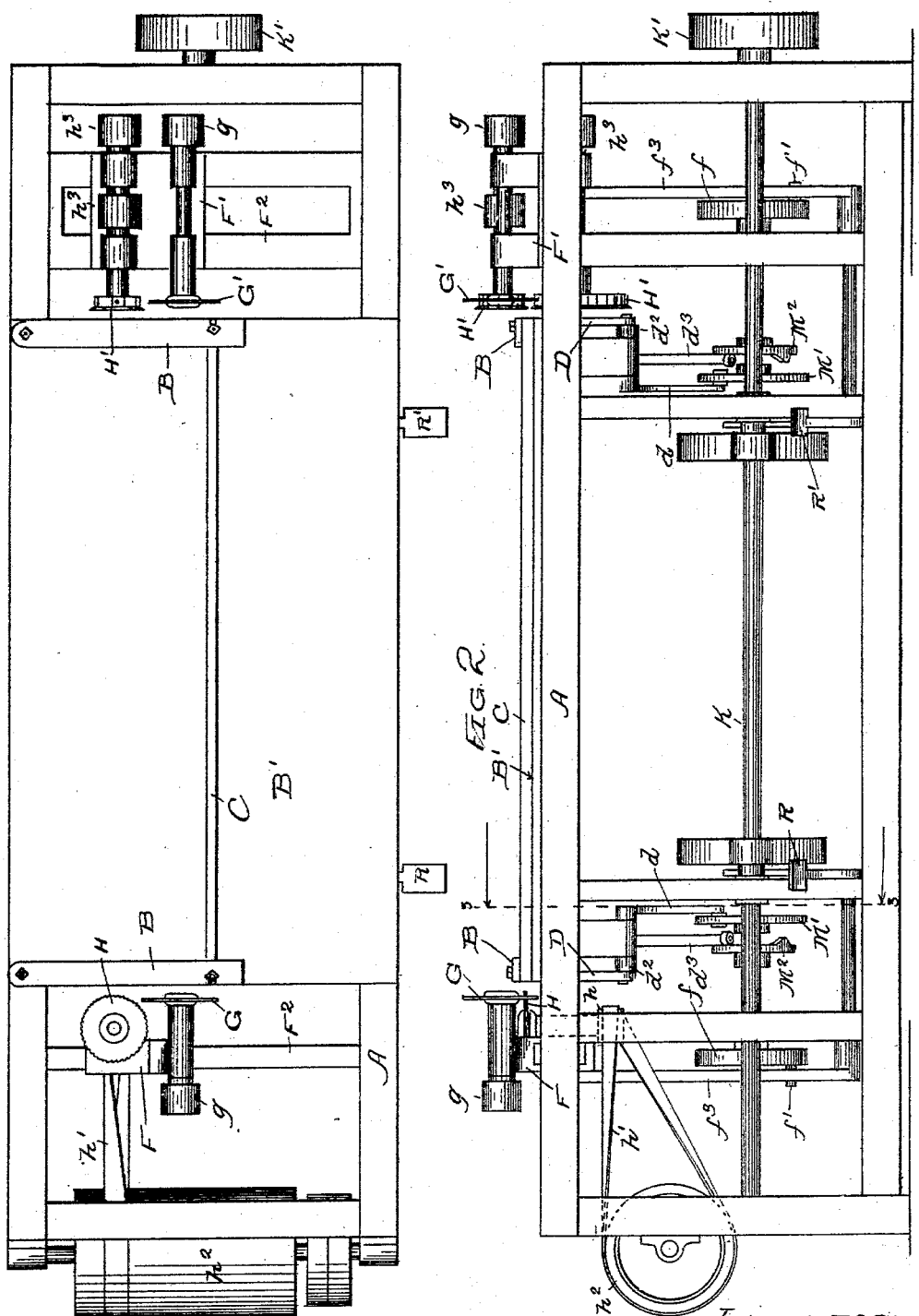

UNITED STATES PATENT OFFICE.

JOHN P. BURNHAM, OF CHICAGO, ILLINOIS, ASSIGNOR TO THOMAS WILCE, OF SAME PLACE.

MACHINE FOR TONGUING AND GROOVING ENDS OF FLOORING-BOARDS.

SPECIFICATION forming part of Letters Patent No. 569,611, dated October 20, 1896.

Application filed January 6, 1896. Serial No. 574,514. (No model.)

*To all whom it may concern:*

Be it known that I, JOHN P. BURNHAM, a citizen of the United States, residing in Chicago, in the county of Cook and State of Illinois, have invented a new and useful Improvement in Machines for Tonguing and Grooving the Ends of Flooring-Boards, of which the following is a specification.

My invention relates to machines for cutting off or squaring and forming interfitting tongues and grooves on the ends of flooring-boards.

In the machines for doing this work, which I have heretofore patented, the boards to be operated upon were laid with their face or smooth side downward upon the table while being operated upon, so that the tongues and grooves would be formed in proper relation to the face or surfaced side of the board to enable the boards when matched together and laid in a floor to produce a perfectly even and smooth surface throughout. In the practical operation of these machines it is necessary, however, for the operator to see or examine the face of the board in order to determine where it should be cut off to remove knots or imperfections, thus requiring him to turn the face side up to look at it and then turn it with the face down to put it in the machine for operation, this double turning of the board often requiring to be repeated for the operation upon its other end, thus occasioning a considerable loss of time and materially increasing the cost and reducing the capacity of the machine, and these machines were not by their construction adapted for operation upon different thicknesses of lumber, as, for example, three-eighths, five-eighths, or one-inch stuff, as the boards were laid with their face upon the table, which was at a fixed height in relation to the tonguing and grooving mechanisms.

The object of my present improvement is to save the time and labor incident to this turning of the board, and also to furnish the machines with means for preventing the marring or injuring of the squared end of the board by the return movement of the cut-off saw. These results I accomplish, and herein my present improvement consists, by combining with the other necessary parts of the machine, first, a guide placed above the bed upon which the board is laid, and which serves to gage the position of the tongue and groove from the face of the board, just as the table served to do in my former machines, and, second, a lifting device for lifting the board up from its bed against such guide; and to prevent the return movement of the cut-off saw from injuring or marring the end of the board or tongue or groove formed thereon I provide the machine with a device or mechanism for automatically sliding the board endwise slightly after the squaring and tonguing or grooving operation is completed and before the slide carrying the cut-off saw and the tonguing or grooving tool makes its return movement.

In practicing my invention I prefer to give the lifting device two movements, one an upward movement to lift the boards and the other a swinging or lateral movement in the direction of the length of the board, so that one and the same instrumentality may perform both these functions; but if desired separate instrumentalities may be used, one for lifting the board and the other for withdrawing it lengthwise from the path of the cut-off saw. As the lifting device will itself operate to press or clamp the board against the face-guide above the board it will be observed that the lifting device also performs the function of the clamp for holding the board in position while being operated upon, as described in my Patent No. 518,804, of April 24, 1894; but other or additional devices may be used for clamping or holding the board in position.

The devices on the one hand for holding, guiding, and supporting the board and the devices on the other hand for cutting off or squaring the ends of the board and tonguing and grooving its ends are relatively movable, the one in respect to the other, one or the other of these two sets of devices reciprocating in respect to the frame of the machine. I prefer to reciprocate the cut-off saws and the tonguing and grooving tools instead of the devices for holding and guiding the board, this being done by mounting the same upon reciprocating slides.

In the accompanying drawings, which form a part of this specification, and in which similar letters of reference indicate like parts, Figure 1 is a plan view of a machine embodying my invention. Fig. 2 is a side elevation. Fig. 3 is a cross-section on the line 3 3 of Fig. 2; and Fig. 4 is an enlarged detail view, partially in vertical longitudinal section, showing the device for lifting the boards against the face-guide above and withdrawing the board from the path of the cut-off saw.

In the drawings, A represents the frame of the machine.

B B are the face-guides, against which the face or surfaced side $x$ of the board X fits and by which the position of the tongues and grooves are gaged.

B' is the bed or support upon which the board X is laid, and C is the edge-guide against which the edge of the board fits while the board is being operated upon.

D D are the lifting devices by which the ends of the board are lifted or pressed against the face-guides B B. The lifting device D is preferably furnished with a somewhat sharp or wedge-like upper end to adapt it to enter the board more or less. By thus furnishing the lifting device with a sharp upper edge I am enabled to give it a definite and positive movement to and from the guide B, the sharp edge of the lifter entering the board more or less to compensate for slight variations in thickness of different boards. By providing the lifter with a sharp edge I am also enabled, by giving it a slight swinging or lateral movement in the direction of the length of the board, to cause it to serve also as a means for withdrawing the board lengthwise from the path of the cut-off saw.

F and F' are two transversely-reciprocating slides or cross-heads, one at or near each end of the machine. The reciprocating slide F carries a saw G for cutting off or squaring the end of the board, and a grooving-tool H for forming the groove in one end of the board, this tool consisting, preferably, of a horizontally-revolving wabble-saw. The other transversely-reciprocating cross-head or slide F' has mounted thereon a pair of tonguing-tools H' H', consisting, preferably, of vertically-revolving cutter-heads. The cross-heads F and F' reciprocate in suitable guideways $F^2$ $F^2$.

K is the main driving-shaft furnished with a driving-pulley K', and M M are two counter-shafts, one at each end of the machine, parallel with the main driving-shaft.

The lifting devices D D are each lifted or moved toward its coöperating face-guide B by means of a cam M' on the shaft M engaging the arm $d$ of the rock-shaft $d'$, the other arm, $d^2$, of which is pivoted to the lifting bar or device D. The bar or device D is given its lateral or swinging movement in the direction of the length of the board X to withdraw the board from the path of the cut-off saw on the return movement of the cross-head, carrying it by means of a cam $M^2$ on the shaft M engaging a lever $d^3$, pivoted at $d^4$ to the frame, and which is connected by a link $d^5$ with the bar or device D. A flat spring $d^6$ serves to return the bar D laterally to its normal position.

The horizontally-revolving grooving-saw H is rotated by a pulley $h$ on its shaft through the belt $h'$, passing around the long transverse pulley $h^2$.

$g$ $g$ are the pulleys for driving the cut-off saws G G'.

$h^3$ $h^3$ are the pulleys for driving the tonguing-tools H' H'. The cross-heads or slides F F' are reciprocated by crank-wheels $f$ on the shafts M, the pins $f'$ of which fit in slots $f^2$ in the levers $f^3$, the upper ends of which are connected by pivoted links $f^4$ with the cross-heads F and F', respectively. Motion is communicated from the driving-shaft K to each of the shafts M M through suitable friction-wheel or clutch mechanisms operated by the treadles R R'; but as this friction-wheel or clutch mechanism is fully shown and described in my said Patent No. 518,804, and as my present improvement does not relate to its particular construction, it is unnecessary to show and describe it here again in detail.

In operation the operator places a board with its face or smooth side upward upon the bed or support B' with its edge against the edge-guide C, adjusting it lengthwise, so that when its end is cut off by the saw all imperfections will be removed, as required. He then places his foot on the treadle and thus throws one of the counter-shafts M into gear with the driving-shaft K. The lifter D is then first operated to lift or press the board against the face-guide B above the board. The cross-head F then reciprocates, carrying the cut-off saw G through the board and causing the grooving-tool H to form the horizontal groove in the squared end of the board. The bar D is then swung laterally in the direction of the length of the board, thus withdrawing it slightly, as illustrated by the dotted lines $x'$ in Fig. 4, so as to be out of the way of the cut-off saw G on the return movement of the cross-head F, which now takes place. The operator then adjusts the other end of the board in position for cutting off its other end and forming the tongue thereon by a repetition of the operation just described.

As the cross-heads F F' are adapted to be reciprocated independently of each other, and as their normal position is back of the edge-guide C, it will be understood that the machine is adapted for cutting off or squaring and forming tongues and grooves on the ends of flooring-boards whatever may be their length, because this construction enables the free end of a long board to project beyond one of the cross-heads while its other end is being operated upon by the tools carried by the other cross-head. This will be readily understood from Fig. 1 of the drawings.

The lifter D, it will be observed, operates to lift only one end of the board at a time, so that the board is slightly tilted and thus cut off by the saw in a plane at a slight inclination to an exact right angle from the face of the board. This is an advantage to the flooring produced, as it insures the forming of a snug, close joint between the abutting ends of two boards at their upper surface or faces when laid in the floor.

To adapt the machine for operation upon boards of different thicknesses, it is only necessary to adjust the face-guides B B up or down and the lifting devices D D up or down.

I claim—

1. In a machine for cutting off or squaring and forming interfitting tongues and grooves on the opposite ends of flooring-boards, the combination of the following parts or elements: a bed or support upon which the board may be laid; an edge-guide for the edge of the board to fit against; face-guides above said bed or support for the face of the board to fit against; lifting devices for lifting or pressing each end of the board alternately against said face-guides; two transversely-reciprocating cross-heads; a cut-off saw and a grooving-tool mounted on one of said cross-heads; a cut-off saw and tonguing-tools mounted on the other of said cross-heads; said machine having also a means for withdrawing the board lengthwise out of the way of the cut-off saws on the return motion of said cross-heads; and mechanism for automatically operating said lifting device, and the means for withdrawing the board lengthwise, substantially as specified.

2. In a machine for cutting off or squaring and forming interfitting tongues and grooves on the opposite ends of flooring-boards, the combination with edge-guide and face-guides for the edge and face of the board to fit against, of devices D D having each a separate movement toward the face-guides to press each end of the board alternately against the same, and each a separate movement lengthwise of the board to withdraw each end of it alternately from the path of the tools after being operated upon thereby; a cut-off saw and a grooving-tool for one end of the board, and a second cut-off saw and tonguing-tools for operating upon the other end of the board, said cut-off saws and grooving and tonguing tools on the one hand, and said devices for holding and guiding the board on the other hand being relatively movable the one in respect to the other, substantially as specified.

3. The combination with the bed or support B' upon which the board may be laid, of an edge-guide C for the edge of the board, a face-guide B above said bed or support for the face of the board, a device D for lifting the board from said bed or support and pressing it against said face-guide, and a transversely-reciprocating tool-carrying cross-head, and mechanism for automatically operating said device D to lift the board and press it against said face-guide, said device D having also a lateral movement in the direction of the length of the board for the purpose of withdrawing the board from the return-path of the tools carried by said cross-head, and mechanism for automatically imparting said lateral movement to said device D, substantially as specified.

4. The combination with the bed or support B' upon which the board may be laid, of an edge-guide C for the edge of the board, a face-guide B above said bed or support for the face of the board, a device D for lifting the board from said bed or support and pressing it against said face-guide, and a transversely-reciprocating tool-carrying cross-head, and mechanism for automatically operating said device D to lift the board and press it against said face-guide, said device D having a shoulderless tapering end with sharp edge to bear against the board to enable it by embedding itself more or less in the board to compensate for variations in the thickness of the board, substantially as specified.

5. The combination with the bed or support B' upon which the board may be laid, of an edge-guide C for the edge of the board, a face-guide B above said bed or support for the face of the board, a device D for lifting the board from said bed or support and pressing it against said face-guide, and a transversely-reciprocating tool-carrying cross-head, and mechanism for automatically operating said device D to lift the board and press it against said face-guide, said device D having also a lateral movement in the direction of the length of the board for the purpose of withdrawing the board from the return path of the tools carried by said cross-head, and mechanism for automatically imparting said lateral movement to said device D, said device D having a sharp end to bear against the board to adapt it to give the board its lengthwise or withdrawing movement, substantially as specified.

6. The combination with a bed or support upon which the board may be laid and an edge-guide for the edge of the board of a face-guide for the face of the board above said bed or support, a device for lifting that end of the board which is being operated upon from said bed or support and pressing said end against said face-guide, a means for imparting to the board a movement in the direction of its length, and a cut-off saw and a matching-tool for forming a tongue or groove on the end of the board, said devices for guiding, holding and moving the board on the one hand, and said cut-off saw and matching-tool on the other hand being relatively movable the one in respect to the other, substantially as specified.

7. The combination with a bed or support upon which the board may be laid and an edge-guide for the edge of the board of a face-guide for the face of the board above said bed or support, a device for lifting that end of the board which is being operated upon from said bed or support and pressing said end against said face-guide, a means for imparting to the board a movement in the direction of its length, and a cut-off saw and a matching-tool for forming a tongue or groove on the end of the board, said devices for guiding, holding and moving the board on the one hand, and said cut-off saw and matching-tool on the other hand being relatively movable the one in respect to the other, and mechanism for automatically operating said device for pressing the board against said face-guide, and the means for giving it its lengthwise movement, substantially as specified.

8. The combination with a bed or support upon which the board may be laid and an edge-guide for the edge of the board of a face-guide for the face of the board above said bed or support, a device for lifting that end of the board which is being operated upon from said bed or support and pressing said end against said face-guide, a means for imparting to the board a movement in the direction of its length, and a matching-tool for forming a tongue or groove on the end of the board, said devices for guiding, holding and moving the board on the one hand, and said matching-tool on the other hand being relatively movable, the one in respect to the other, substantially as specified.

9. The combination with an edge-guide for the edge of the board of a face-guide for the face of the board, a device for pressing the board against said face-guide, a means for imparting to the board a movement in the direction of its length, and a matching-tool for forming a tongue or groove on the end of the board, said devices for guiding, holding and moving the board on the one hand, and said matching-tool on the other hand being relatively movable the one in respect to the other, said device for pressing the board against said face-guide and said means for imparting to the board a movement in the direction of its length, consisting of a bar D provided with a sharp end for engaging the board, substantially as specified.

JOHN P. BURNHAM.

Witnesses:
H. M. MUNDAY,
S. E. CURTIS.